United States Patent [19]

Brunelle

[11] 4,394,047

[45] Jul. 19, 1983

[54] SEAT BACK MOUNTING SYSTEM

[75] Inventor: Rene J. Brunelle, Wolcott, Conn.

[73] Assignee: UOP Inc., Des Plaines, Ill.

[21] Appl. No.: 269,157

[22] Filed: Jun. 1, 1981

[51] Int. Cl.³ .............................................. A47C 1/027
[52] U.S. Cl. ..................................... 297/361; 16/339;
   244/122 R; 297/376; 297/378
[58] Field of Search ........................ 297/361, 374–376,
   297/378, 354, 355; 74/531; 16/337–339, 342;
   244/122 R, 118.5, 118.6

[56] References Cited

U.S. PATENT DOCUMENTS

| 2,585,447 | 2/1952 | Eichorst | 297/376 |
|---|---|---|---|
| 2,802,516 | 8/1957 | Liliengren | 297/374 |
| 3,441,313 | 4/1969 | Persson | 297/374 |
| 4,254,924 | 3/1981 | Brennan | 244/122 |

FOREIGN PATENT DOCUMENTS

| 614074 | 6/1935 | Fed. Rep. of Germany | 16/339 |
|---|---|---|---|
| 390949 | 4/1933 | United Kingdom | 297/376 |

*Primary Examiner*—William E. Lyddane
*Attorney, Agent, or Firm*—James R. Hoatson, Jr.; Barry L. Clark; William H. Page, II

[57] ABSTRACT

Mounting system for the back rest of a vehicle seat permits normal reclining action as well as two modes of forward movement. In a first mode, a slight forward force applied near the top of the seat back, such as about 10 lbs. or less, will pivot the top of the seat back forwardly several inches to facilitate access to the space behind the seat. The slight rearward force produced by an occupant leaning back against the seat back as he occupies the seat will then return the back to its normal upright position. A substantially larger forward force, such as one of about 25–35 lbs., can also be applied to the top of the seat back in a second mode to cause the back to "break-over" about 90° and lie flat. The various movements are achieved by means of a channel-shaped quadrant member which overlies the back rest frame on one side of a seat, pivots on the back rest support shaft, and includes a long curved slot and a short curved slot. A pair of bolts are adjustably tightened to varying degrees such that one bolt will frictionally engage and support the long slot of the quadrant member for movement relative to the seat back frame with substantially more force than the other bolt, which passes through the short slot, frictionally applies to the seat back reclining mechanism. The ability to control friction between the bolt and the short slot allows adjustments for friction changes due to wear and also permits the elimination of the first mode, if such appears desirable, by tightening the bolt in the short slot so that it takes more force to move it than it does to move the bolt in the longer slot.

3 Claims, 5 Drawing Figures

U.S. Patent   Jul. 19, 1983   4,394,047
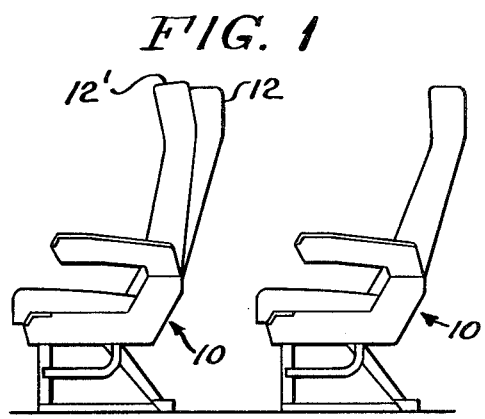
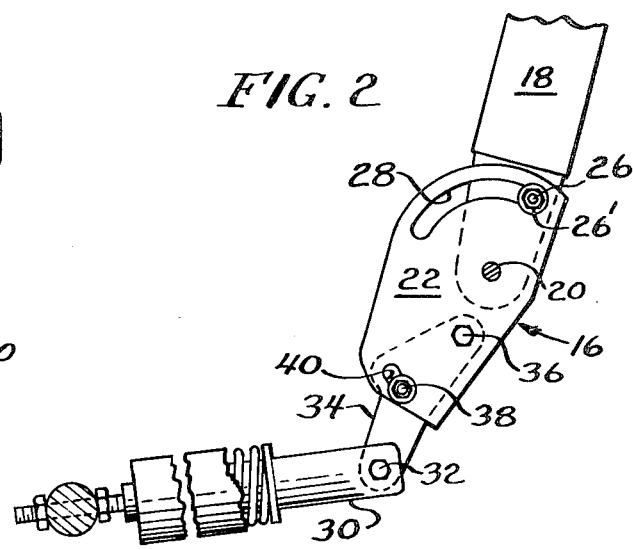
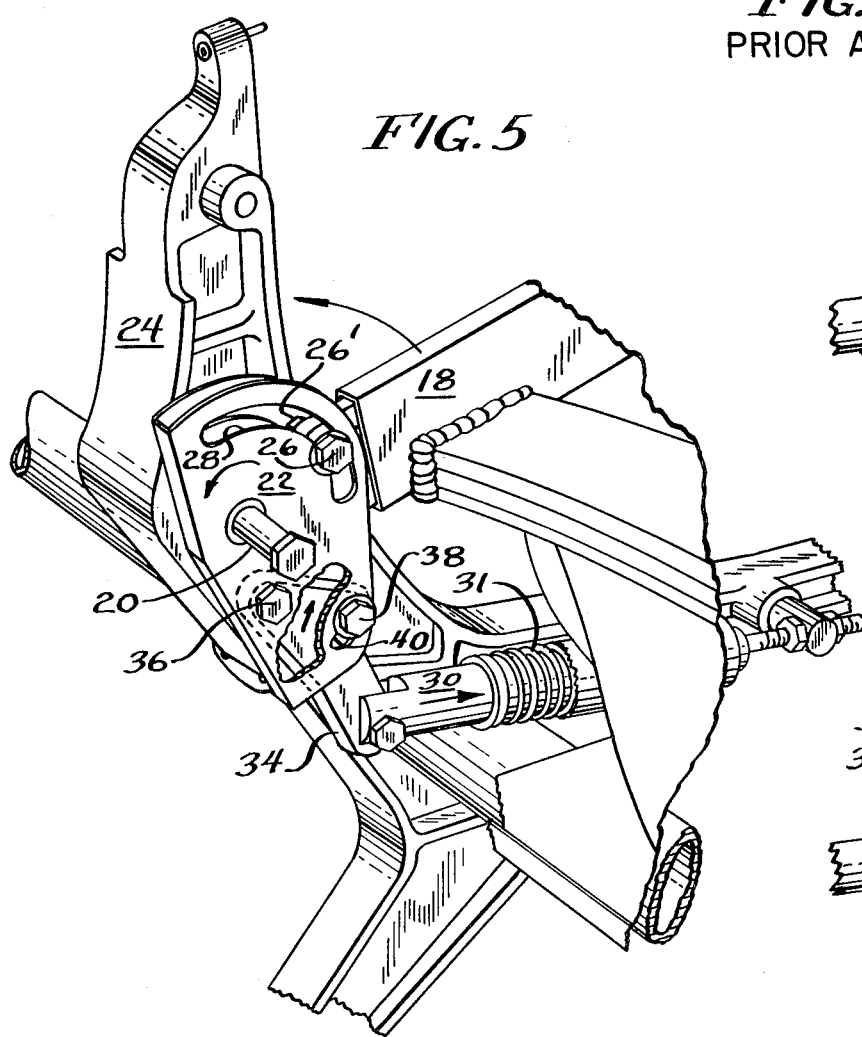
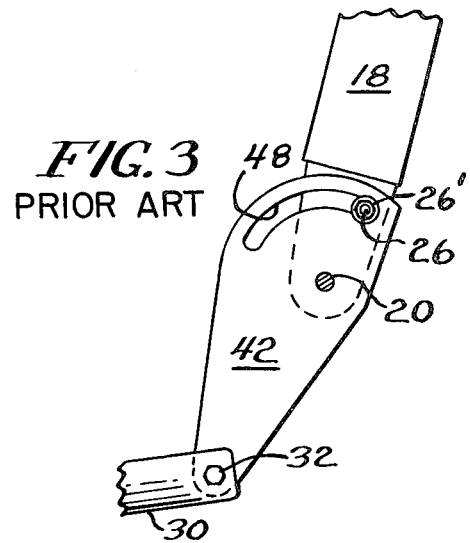
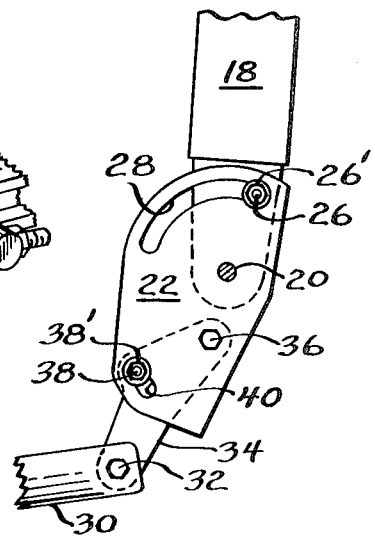

SEAT BACK MOUNTING SYSTEM

BACKGROUND OF THE INVENTION

The invention relates to vehicle seats and especially to seats of the type generally used in aircraft which have a reclinable back rest and which must also be capable of being pivoted forwardly to a "break-over" position when a substantial forward force of at least about 25–35 pounds is applied to the back of the seat near its top. The "break-over" position helps protect the seat cushions during cleaning and servicing operations and also helps to protect a passenger seated immediately rearwardly in a crash situation. With the advent of increased operating expenses caused mainly by escalating fuel prices, many airlines have tried to reduce their costs by increasing the seating density, usually by moving the rows of seats closer to each other, and/or by placing three seats abreast where there were formerly only two. Where the rows are quite close together, the passenger entry space behind each seat is naturally quite cramped. Also, a passenger's ability to gain access to a seat which is spaced from the aisle is further encumbered by the fact that the seat backs are normally inclined about 15° to the rear when they are in their normal "upright" position. Thus, it is quite awkward to try to walk behind a seat since one cannot stand up straight. One solution to the problem is disclosed by Brennan, U.S. Pat. No. 4,254,924 wherein a nylon block having two apertures is carried by a linkage means and is engaged by a pin secured to the seat back. The pin is caused to move through a narrow slot joining the two apertures when a small forward force is applied to the top of the seat back, thus permitting the seat back to be pivoted forwardly about 17° to a "dress-up" position allowing improved passenger ingress and egress to the space behind the seat. The force required to initiate movement is not adjustable and would seem to be subject to change due to wear of the parts.

SUMMARY

It is among the objects of the present invention to provide a seat back mounting system which will permit the seat back to be reclined, to be "broken-over" to a horizontal position, or to be moved to a position slightly forward of its normal, upright position. Yet another object is to provide such a mounting system which is directly interchangeable with an existing mounting system which only permits recline or "break-over". A still further object is to provide a mounting system which includes not only a capability of moving a back rest slightly forward of its normal upright position, but a means to adjust the force required to produce such movement or to effectively prevent its taking place.

These and other objects are provided by the mounting system of the present invention which utilizes a channel-shaped quadrant member pivotally mounted to the seat base frame. The quadrant member has an elongated curved slot near its top and a short slot near its bottom. The lower end of the vertical side portion of the seat back frame is pivotally mounted to the quadrant member intermediate the top and bottom slots and carries a bolt which moves within the elongated slot so as to define the use position of the seat back at the rearward end of the slot and the "break-over" position at the forward end of the slot. The bolt, in cooperation with a threaded nut, is adjustably tensioned so as to provide a substantial frictional force along the edges of the elongated slot.

BRIEF DESCRIPTION OF THE DRAWINGS

FIG. 1 is a side view illustrating the improvement in passenger access space behind a seat incorporating the invention;

FIG. 2 is a fragmentary side view of the mounting system of the present invention when the seat back is in its second mode position with the seat back in its normal, upright use position;

FIG. 3 is a fragmentary side view similar to FIG. 2, but showing a prior art mounting system;

FIG. 4 is a fragmentary side view showing the mounting system structure of FIG. 2 in its first mode position with the seat back in a forward position which provides increased access space behind the seat; and FIG. 5 is a fragmentary perspective view illustrating the pivotal attachment of the channel-shaped quadrant element of the mounting system to a seat support frame, with the seat back in its "break-over" position.

DETAILED DESCRIPTION OF THE PREFERRED EMBODIMENT

FIG. 1 illustrates the environment in which the invention is utilized. The figure illustrates two multi-passenger aircraft seats indicated generally at 10, positioned relatively close to each other as they would be in many aircraft. The seat back indicated at 12 is depicted in its normal upright position. In the normal upright position, it can be seen that the rear of the back rest 12 impinges considerably on the rather small access space between the two rows of seats with the result that a passenger usually has to bend his body rather awkwardly to gain entrance to his seat. The aisle seat in the forward row is shown as having its back rest 12' positioned considerably forwardly of the adjacent back rest 12 in order to illustrate the amount of passenger access space which can be gained by the use of the mounting structure of the present invention. In terms of actual dimensions, the top of the back rest 12' is preferably about four inches forward of the top of the back rest 12.

The improved mounting structure of the present invention will be readily understood by referring to FIGS. 2, 4 and 5. In FIG. 2, the back rest support assembly is indicated generally at 16 and includes a generally vertical arm member 18 which comprises a side portion of the support frame for the seat back 12. The arm member 18 is pivotally attached by a bolt member 20 to a channel-shaped quadrant member 22 which is preferably formed of sheet metal. The bolt 20 pivotally supports both the arm 18 and the quadrant member 22 relative to the fore and aft support member 24 (FIG. 5) which joins the front and rear stretcher members (not shown) of the seat and provides a mounting for the arm rests (not shown). A bolt 26, which is carried by the arm 18 permits the arm to pivot about the bolt 20 within the constraints provided by the slot 28 formed in the quadrant member 22. The bolt 26 is held in tight engagement with the edges of the slot 28 by means of a nut 26'. The nut 26' is preferably tightened to such a degree that it will take approximately 25–35 lbs. of force on the upper rear portion of the back rest 12 to cause the bolt 26 and arm 18 to move within the slot 28 in order that the back rest may be moved to the horizontal "break-over" position shown in FIG. 5. The restraining force provided by the nut and bolt 26', 26 is quite substantial since the "break-over" position is not one usually encountered by a passenger. The position is used for permitting the seat back rest to be folded approximately 90° forward into contact with the seat cushion so as to facilitate access to the aisles for cleaning or to protect the seat cushions when maintenance work is being done in the aircraft, for example. The ability of the seat back to pivot forward is also important in a crash situation wherein the forward movement cushions the impact on the passenger immediately to the rear of the seat back.

The element 30 shown in FIG. 2 is the rear portion of the recline lock assembly member 30. The recline lock (not shown) usually includes a hydraulic cylinder and is actuated by a passenger to permit the seat back to be reclined. The lock assembly includes a spring 31 (FIG. 5) to cause the seat back to be returned to its FIG. 2 position when the lock is released and the passenger removes the pressure of his body on the seat back. The recline assembly member 30 is pivotally attached by a pin 32 to a recline position actuating link 34 which is positioned between the side flanges of the quadrant member 22 and pivotally attached thereto by a pivot pin 36. A bolt 38 and a nut 38' are fixedly positioned in an aperture in the link 34 and engage the short slot 40 in the quadrant member 22 so as to permit a limited degree of rotational movement of the quadrant member 22 relative to the link 34. It is preferable that the nut 38' be tightened sufficiently so that relative movement between quadrant 22 and actuator 34 will be frictionally restrained until a force of approximately 5-10 lbs. is applied to the back of the back rest member 12. This small amount of friction will make it relatively easy for a flight attendant to move all of the seat backs slightly forward to their position 12' before the passengers enter the aircraft for boarding. The force is also minimal enough that the pressure normally applied by a passenger as he sits down will be sufficient to return the seat back from the slightly forward position 12' to the normal upright position 12. When the seat is in its normal upright use position, actuation of the recline lock assembly 30 will permit the seat back to be reclined. The rearward force applied to the seat back by the passenger during the recline operation will cause the seat back frame 18, the quadrant member 22, and the actuator link 34 to all move as one element to displace the recline lock member 30 to the left relative to the position shown in FIG. 2. Since the bolts 26 and 38 are already at the right end of their respective slots 28, 40, it is obvious that the various parts will move as one. In FIG. 4, the bolt 38 is in the opposite end of slot 40 as compared to FIG. 2, a position corresponding to the slightly forward seat back position 12' shown in FIG. 1. If it were desired to immediately recline the seat back from its FIG. 4 position, the initial rearward force applied to the seat back would first cause the quadrant 22 to pivot to its FIG. 2 position without any movement of link 34, after which further force would result in movement of link 34, pin 32 and recline lock member 30 to the left of their FIG. 4 position.

FIG. 3 shows a prior art seat back mounting arrangement with which my improved design is interchangeable. The prior art design utilizes a quadrant member 42 which is directly pivotally attached to the pin 32 carried by the recline lock member 30. The quadrant 42 includes an elongated slot 48 which permits the seat back to be folded forwardly to a "break-over" position, but it does not permit the seat back to be moved slightly forwardly to facilitate access to a seat.

By adjusting the tension between bolt 38 and its nut 38', it is quite simple to vary the amount of force required to move the seat back forwardly so as to accommodate wear between the bolt and slot. It is also possible to tension the bolt to a greater extent than bolt 26 and eliminate the forward adjustment feature, if desired.

I claim as my invention:

1. A mounting system for a back rest of a multi-passenger vehicle seat comprising a pivotable support element carried by a seat base frame; said pivotable support element having the back rest pivotally attached thereto so as to permit approximately 90° of frictionally restrained movement of the back rest relative to the pivotable support element in a forward, vertical to horizontal path in response to the application of a relatively large force to the seat back; an actuating link for transmitting pivotal reclining motion of said pivotal support element and said back rest to a generally axially movable portion of a recline lock assembly carried by the seat base frame, said actuating link being pivotally mounted at its respective ends to said pivotal support element and to said axially movable portion of said recline lock assembly, said actuating link being mounted intermediate its ends to said pivotal support element so as to permit a small degree of frictionally restrained movement relative to said pivotable support element, said small degree of frictionally restrained movement being instituted by the application of a force to the seat back which is considerably smaller than the force required to move said back rest relative to said pivotable support element.

2. The mounting system of claim 1 wherein the frictional restraint resisting pivotal movement of said back rest relative to said pivotal support element is sufficient to require that at least about 25 pounds of force be applied at the top of the back rest to overcome it, and the frictional restraint resisting pivotal movement of said actuating link relative to said pivotal support element is such that no less than about 5 pounds or more than about 15 pounds of force are required to be applied at the top of the seat back to overcome it.

3. The mounting system of claim 1 wherein said pivotable support element comprises a generally channel-shaped member between the side flanges of which the frame of the back rest and said actuating link are pivotally mounted, each of said side flanges including an elongated curved slot and a short slot which are aligned with identical slots on the other side flange; a first nut and bolt assembly positioned so as to frictionally engage the exterior edges of said elongated slots while passing through an aperture in said back rest frame at a location spaced from its point of pivotal attachment to said pivotal support element; a second nut and bolt assembly positioned so as to frictionally engage the exterior edges of said short slots while passing through an aperture in said actuating link at a location spaced from its point of pivotal attachment to said pivotable support element; said first and second nut and bolt assemblies being respectively tensioned so that substantially less force must be applied to the back of the seat back to cause said pivotable support element and back rest to pivot together relative to said actuating link than is required to cause said back rest to pivot relative to said pivotable support element.

* * * * *